US011659846B2

(12) United States Patent
Kochkar et al.

(10) Patent No.: US 11,659,846 B2
(45) Date of Patent: May 30, 2023

(54) SEPARATION COLUMN CONTAINING TITANIUM OXIDE NANOTUBES

(71) Applicant: Imam Abdulrahman Bin Faisal University, Dammam (SA)

(72) Inventors: Hafedh Kochkar, Dammam (SA); Nuhad Abdullah Alomair, Dammam (SA); Reem Khalid Albilali, Dammam (SA); Suhailah Saud Aljameel, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 18/048,468

(22) Filed: Oct. 21, 2022

(65) Prior Publication Data
US 2023/0062091 A1 Mar. 2, 2023

Related U.S. Application Data

(62) Division of application No. 16/564,644, filed on Sep. 9, 2019, now Pat. No. 11,517,023.

(51) Int. Cl.
*A23C 7/04* (2006.01)
*B01J 20/02* (2006.01)
*B01J 20/28* (2006.01)
*A23L 5/20* (2016.01)
*B01J 20/04* (2006.01)
*B01J 20/06* (2006.01)

(52) U.S. Cl.
CPC .............. *A23C 7/043* (2013.01); *A23L 5/273* (2016.08); *B01J 20/0211* (2013.01); *B01J 20/041* (2013.01); *B01J 20/28007* (2013.01); *B01J 20/28016* (2013.01); *B01J 20/28061* (2013.01); *B01J 20/06* (2013.01); *B01J 20/28004* (2013.01); *B01J 20/28083* (2013.01)

(58) Field of Classification Search
CPC ...... A23L 5/273; A23C 7/043; B01J 20/0211; B01J 20/041; B01J 20/28007; B01J 20/28016; B01J 20/28061; B01J 20/06; B01J 20/28004; B01J 20/28083
USPC ........................................................ 426/580
See application file for complete search history.

(56) References Cited

U.S. PATENT DOCUMENTS 10,702,833 B2 * 7/2020 Panaitescu ............. C25D 11/02

FOREIGN PATENT DOCUMENTS

| CN | 104587988 A | 5/2015 |
|---|---|---|
| CN | 105854848 A | 8/2016 |
| CN | 106582518 A | 4/2017 |
| JP | 2016-195981 A | 11/2016 |
| TN | 2013/61 | 2/2013 |

OTHER PUBLICATIONS

Machine translation of TN 20013000061 A, Feb. 13, 2013.*
Zhang et al., "The selection of suitable columns for a reversed-phase liquid chromatographic separation of beta-lactam antibiotics and related substances via chromatographic col. parameters", Journal of Chromatography A, 1323, 2014, pp. 87-96.*
Sehati, et al. ; Extraction and preconcentration of tylosin from milk samples through functionalized TiO2 nanoparticles reinforced with a hollow fiber membrane as a novel solid/liquid-phase microextraction technique ; J. Sep. Sci. 37 ; pp. 2025-2031 ; May 4, 2014 ; 7 Pages.
Wang, et al. ; A nano-composite comprised of Ti-doped TiO nanotubes and Ag PO quantum dots with enhanced photocatalytic activity under visible light ; Materials Letters, vol. 240 ; pp. 35-38 ; Apr. 1, 2019 ; Abstract Only ; 2 Pages.
Wu, et al. ; Topotactic Growth, Selective Adsorption, and Adsorption-Driven Photocatalysis of Protonated Layered Titanate Nanosheets ; Applied Materials & Interfaces ; Sep. 2014 ; 15 Pages.
Izanloo, et al. ; Trace quantification of selected sulfonamides in aqueous media by the implementation a new dispersive solid-phase extraction method using a nanomagnetic titanium dioxide graphene based sorbent and HPLC-UV ; Journal of Separation Science ; Dec. 2017 ; 24 Pages.
Sehati, et al. ; Application of hollow fiber membrane mediated with titanium dioxide nanowire/reduced graphene oxide nanocomposite in preconcentration of clotrimazole and tylosin ; Journal of Chromatography A ; 2015 ; 45 Pages.
Li et al., "Highly efficient removal of chlorotetracycline from aqueous solution using graphene oxide/TiO2 composite: Properties and mechanism", Applied Surface Science 425 (2017) pp. 765-775.
Dahl et al., "Composite Titanium Dioxide Nanomaterials", Chem. Rev. (2014), 114, pp. 9853-9889.
Wang et al., "Adsorptive Removal of Tetracycline on Graphene Oxide Loated with Titanium Dioxide Composites and Photocatalytic Regeneration of the Adsorbents", J. Chem. Eng. (2018), 63, pp. 409-416.
Sehati et al., "Extraction and preconcentration of tylosin from milk samples through functionalized TiO2 nanoparticles reinforced with a hollow fiber membrane as a novel solid/liquid-phase microextraction technique", J. Sep. Sci., (2014), 37, pp. 2025-2031.

* cited by examiner

*Primary Examiner* — Elizabeth D Wood
(74) *Attorney, Agent, or Firm* — Oblon, McClelland, Maier & Neustadt, L.L.P.

(57) ABSTRACT

A method of removing one or more antibiotics from a dairy product, the method involve passing the dairy product comprising an antibiotic in a first amount through a bulk comprising, relative to a total bulk weight, at least 75 wt. % of titanium oxide nanostructures, to provide the dairy product comprising the antibiotic in a second, lesser amount, wherein the nanostructures have lengths at least two-fold in excess of their width and height. Bulk materials useful in this or related methods or applications may have loosely tangled, noodle-like morphologies on sub-100 nm scale, and need not employ graphene and/or polymeric support networks in columns, generally having only titanium oxides without silicon or iron oxides.

8 Claims, 9 Drawing Sheets

SEPARATION COLUMN CONTAINING TITANIUM OXIDE NANOTUBES

CROSS-REFERENCE TO RELATED APPLICATIONS

The present application is a Divisional of U.S. application Ser. No. 16/564,644, now U.S. Pat. No. 11,517,023, having a filing date of Sep. 9, 2019.

FIELD OF THE INVENTION

The present disclosure relates to titanium-comprising nanostructures, such as nanotubes, and to methods of their make and use, particularly in separative technologies and particularly with regard to dairy products, such as milk, and the removal of, e.g., antibiotics.

DESCRIPTION OF THE RELATED ART

Food safety is an increasingly important concern in the public health field, with special issues relating to milk and other dairy products. Such dairy products, particularly milk, are considered complete foods and occupy important places in the daily diet of world populations. The contamination of milk by antibiotics is problematic and may present a public health risk.

Antibiotics are generally produced by microbial fermentation processes which may produce a large amount of solid waste in the form of antibiotic fermentation byproducts, substantially including residual antibiotics. Antibiotic fermentation byproducts may contain high levels of proteins and polysaccharides, thus making them suitable for use as animal feed or as fertilizer. In addition, antibiotics are widely used in breeding systems for prophylaxis, or as food additives or growth factors of animals, leading to the emergence of resistant strains. Disregard for waiting times after treatment may lead to the presence of antibiotic residues in animal products including milk. Moreover, antibiotic residues at high doses are also found in raw and pasteurized milks, yogurts, cheeses, butter, and fermented beverages. These observations caution against improper uses of antibiotics which may lead to the entry of antibiotics into the human food chain.

Antibiotic contamination of dairy products, including milk, has been remedied by a variety of approaches, including selective phase extraction of antibiotics, liquid-liquid extraction sometimes using harmful solvents, and UV light or gamma ray irradiation degradation. The various methods of the art suffer shortcomings, including environmental insensitivity and potential inapplicable or unusable with real milk matrices due to contamination problems.

$TiO_2$ nanomaterials with controlled morphology, such as nanotubes, nanowires, nanorods, nanospheres, etc., have been used in various processes because of their inertness and low cost. Previous efforts have shown $TiO_2$ to be an excellent adsorbent for polycyclic aromatic hydrocarbons (PAHs), e.g., in the treatment of surface water (tap, river, and dam/reservoir) samples, with PAH recoveries spiking in water samples from 90% to 100%. Various efforts have been made in applying titanium compounds to treating milk CN 106582518 A by Han et al. (Han) discloses a graphene-$TiO_2$ nanotube hydrogel, its preparation and use. Han's method includes: (1) adding water to graphene oxide (GO) to dissolve the GO to obtain a GO water solution; (2) adding the $TiO_2$ nanotube to the GO water solution with stirring to prepare a graphene-$TiO_2$ nanotube solution; (3) preparing an $FeSO_4$ water solution; (4) adding the $FeSO_4$ water solution to the graphene-$TiO_2$ nanotube solution with uniform mixing to obtain a mixed liquid; (5) self-assembling the mixed liquid in (4) in a water bath to obtain the graphene-$TiO_2$ nanotube hydrogel. Han describes a system requiring graphene, most preferably in a weight ratio of 2.5:1 relative to $TiO_2$ nanotubes and tolerating at most 1:3. Han does not disclose removing antibiotics from milk, nor contacting milk with titanium oxide nanoparticles, particularly not with a chemical formula $H_xNa_{2-x}Ti_2O_5H_2O$, $x \leq 2$. Han's material has no 2θ peak around 10° and is poorly crystallized.

TN 2013000061 A1 by Kochkar et al. (Kochkar) discloses a solid-phase extraction procedure (SPE) of rare earth elements, such as Y, La, Ce, Pr, Nd, Pm, Eu, Gd, Tb, Dy, Dy, Ho, er, Tm, Yb, Lu, Ac, Th, Pa, and U, through a column filled with $TiO_2$ nanotubes. Kochkar uses a column containing $H_xNa_xTi_2O_5H_2O$, $x \leq 2$, for extracting rare earth elements in various matrices, e.g., water, soil, and phosphogypsum. Kochkar regenerates its column for 20 cycles without altering the level of enrichment (99%) of rare earths. Kochkar describes a titanate species wherein x is 0 being transformed by 500° C. thermal treatment into mixture of nanotubes and nanorods and applied to extract rare earth elements in an acetate buffer solution at a pH of 5, but does not disclose removing antibiotics from milk using its nanomaterial.

CN 104587988 B to Hu et al. (Hu) discloses an anatase type $TiO_2$ nanometer material monolithic column, its preparation and use. Hu's preparation comprises: synthesizing uniform anatase type $TiO_2$ nanoparticles, uniformly dispersing monomers, a cross-linking agent, a pore-forming agent, anatase type $TiO_2$ nanoparticles, and an initiator in the vortex and ultrasonic mode; ultrasonically removing bubbles in prepolymerization solution; injecting the mixture into a vinylated quartz capillary; sealing the two ends; reacting in a water bath; and washing with ethanol to obtain the product. Hu uses a monomer, such as methacrylic acid or glycidyl methacrylate, and a cross-linking agent, such as ethylene glycol dimethacrylate or glycerol trimethacrylate, respectively each making out 22% of Hu's column material. Hu does not disclose removing antibiotics from milk with its material.

JP 2016-195981 A by Miyabe et al. (Miyabe) discloses an adsorbent for adsorption/removal of Cs and/or Sr even in sea water and its production. Miyabe's adsorbent includes a compound of formula $ATiSiO.nHO$ (A is Na, K, and/or Li; n is 0 to 8); a compound of formula $ATiO.mHO$ (m is 0 to 10); and a compound of formula $(AH)TiO.mHO$ ($0.1 \leq x \leq 2$). A in at least one of Miyabe's compounds contains Li, which makes the substance an adsorbent for Cs or Sr. Miyabe also discloses $H_xNa_{2-x}Ti_2O_5.mH_2O$ ($1 \leq x \leq 2$; m is 0 to 10), but its one or more compounds have XRD peaks at 2θ diffraction angles of 9 to 11 (10 to 13), 25 to 29 (main peak at 27 to 29.5), and/or 36 to 38°. Miyabe targets a molar ratio of Ti:Si of 0.5 to 3.0 and discloses neither antibiotic nor milk treatments.

CN 105854848 A by Zheng et al. (Zheng) discloses a composite hydrogel based on titanium nanotubes and graphene. Zheng's titanium nanotubes are dispersed on the surface of oxidized graphene. Zheng prepares its composite hydrogel without organic solvents and without generating pollutants. Zheng's composite hydrogel can adsorb tetracycline with good selectivity, an may be useful in wastewater treatment. However, Zheng's material includes graphene oxide in a weight ratio of at least 2:1.5, relative to Ti nanotubes, and lacks an XRD 2θ diffraction angle at 10°. Zheng does not disclose removing antibiotics from milk.

*J. Sep. Sci.* 2014, 37, 2025-2031 by Sehati et al. (Sehati I) discloses a method for determining tylosin in different milk samples. Sehati I uses functionalized $TiO_2$ hollow fiber solid/liquid-phase microextraction to disperse a functionalized $TiO_2$ nanoparticle acceptor phase in organic solvent and detain the $TiO_2$ in pores and lumen of a porous polypropylene hollow fiber membrane. Sehati I's $TiO_2$ nanoparticles are functionalized in mildly acidic aqueous $H_2O_2$ under UV irradiation. Sehati I tests factors such as pH, stirring rate, salt addition, extraction time, and donor phase volume, and separates tylosin from milk samples.

*Mater. Lett.* 2019, 240, 35-38 by Wang et al. (Wang) discloses a nano-composite of $Ti^{3+}$-doped $TiO_2$ nanotubes (TNTs) and $Ag_3PO_4$ quantum dots synthesized by a two-step method. Wang uses $NaBH_4$ to reduce Ti and introduce $Ti^{3+}$ into TNTs to enhance the adsorption capacity and the absorption of visible light of TNTs, and Wang's $Ag_3PO_4$ quantum dots, deposited on TNTs, were synthesized via precipitation. Wang's nano-composite photocatalyst can degrade tetracycline under visible light. Wang's material does not describe treating milk with the Ti-material, particularly not for separating antibiotics.

*ACS Appl. Mater. Interf* 2014, 6(20), 17730-17739 by Wu et al. (Wu) discloses selectively adsorbing and adsorption-driven photocatalytic layered titanates for potential applications in water purification. Wu's lepidocrocite-like, layered, protonated titanate ($H_2Ti_2O_5H_2O$, "HTO") nanosheets were synthesized by ion-exchange. Wu's compound can adsorb fluoroquinolones with interlayer HTO spacings and electrostatic interactions. Wu's HTO uptake could be controlled by pH. Wu's HTO nanosheets have a large percentage of (010) faces exposed. Wu's nanosheet material is not calcined after hydrothermal synthesis, and Wu adsorbs optimally at pH 5.5, followed by UV degradation of the fluoroquinolones.

*Separation Sci.* 2018, 41(4), 910-917 by Izanloo et al. (Izanloo) discloses a dispersive solid-phase extraction method using a nanomagnetic $TiO_2$ graphene-based sorbent with HPLC and UV detection. Izanloo's method could quantify traces of sulfacetamide, sulfathiazole, sulfamethoxazole, and sulfadiazine in aqueous media. Izanloo's nanomagnetic $TiO_2$ graphene-based sorbent was used for sorption and extraction of selected sulfonamides mainly through $\pi$-$\pi$ stacking hydrophobic interactions. Izanloo's $TiO_2$—RG@$SiO_2$@$Fe_3O_4$ sorbent further comprises silica and iron oxide, and Izanloo does not describe separating penicillin-like antibiotics from milk or dairy products.

*J. Chromat. A* 2015, 1420, 46-53 by Sehati et al. (Sehati II) discloses $TiO_2$ nanowires and nanoparticles anchored on graphene oxide (GO) nanosheets by a one-step hydrothermal method. Sehati II's sorbents are reinforced with microporous hollow fiber membrane via sol-gel technology, and may be used for simultaneous preconcentration and determination of clotrimazole and tylosin using HPLC-UV detection. Sehati II describe determining ultra trace amounts of target analytes in milk and urine samples.

In light of the above, a need remains for effective and simplified separative materials, methods, and systems, particularly for treating dairy products, such as milk, and for separating antibiotic residues or contamination from such dairy products, particularly β-lactam antibiotics.

SUMMARY OF THE INVENTION

Aspects of the invention provide methods of removing one or more antibiotics from a dairy product, which methods may comprise: passing the dairy product comprising an antibiotic in a first amount through a bulk comprising, relative to a total bulk weight, at least 75 wt. % of titanium oxide nanostructures, to provide the dairy product comprising the antibiotic in a second amount, wherein the first amount is greater than the second amount, and wherein the nanostructures have lengths at least two-fold in excess of their width and height. Inventive methods, columns, stationary phases, nanostructures, and mixtures may be modified by any permutation of the features described herein, particularly the any of the following.

The titanium oxide nanostructures may be nanotubes having an average diameter in a range of from 5 to 200 nm.

The titanium oxide nanostructures have a formula $H_xNa_{2-x}Ti_2O_5.(H_2O)$, wherein $x \leq 2$.

The dairy product may be milk.

The dairy product may be eluted in a carrier having a pH in a range of from 5.0 to 8.0.

The bulk may be present in the form of a stationary phase within a column packed with the bulk.

The bulk may comprise no more than 5 wt. % of materials aside from titanium oxide, relative to the total bulk weight.

The passing may occur at a pressure in a range of from 2 to 20 bar. The passing may comprise removing no more than 5 wt. % of an original amount of non-antibiotic components of the dairy product, preferably no more than 2 wt %, 1 wt %, or 0.5 wt % of an original amount of non-antibiotic components of the dairy product.

The first amount of the antibiotic may be in a range of from 10 to 1200 ppm.

The second amount of the antibiotic, reached immediately after the passing, may be no more than 15% of the first amount.

The bulk may comprise no fiber support.

Aspects of the invention comprise columns, comprising: a stationary phase comprising at least 90 wt. % of titanium oxide nanotubes, relative to a total weight of the stationary phase, wherein the titanium oxide has a formula $H_xNa_{2-x}Ti_2O_5.(H_2O)$, wherein $x \leq 2$, and wherein the nanotubes have an average diameter in a range of from 5 to 200 nm.

The average diameter of the nanotubes may be no greater than 20 nm.

The titanium oxide nanotubes may have a BET surface area in a range of from 125 to 225 $m^2/g$, and/or an average pore size in a range of from 65 to 85 Å, and/or an average particle size in a range of from 60 to 125 µm.

The titanium oxide nanotubes may have an orthorhombic or anatase crystal structures.

Inventive columns may have a length in a range of from 10 to 30 cm and an internal diameter in a range of from 1 to 10 mm.

The stationary phase may comprise no more than 0.1 wt. % of organic polymer and graphite.

Aspects of the invention include mixtures, comprising: titanium oxide nanotubes having a formula $H_xNa_{2-x}Ti_2O_5.(H_2O)$, wherein $x \leq 2$; an antibiotic; and a dairy product, wherein the nanotubes have an average diameter in a range of from 5 to 200 nm.

In the inventive mixtures, the dairy product may be milk and/or the antibiotic may be a β-lactam antibiotic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
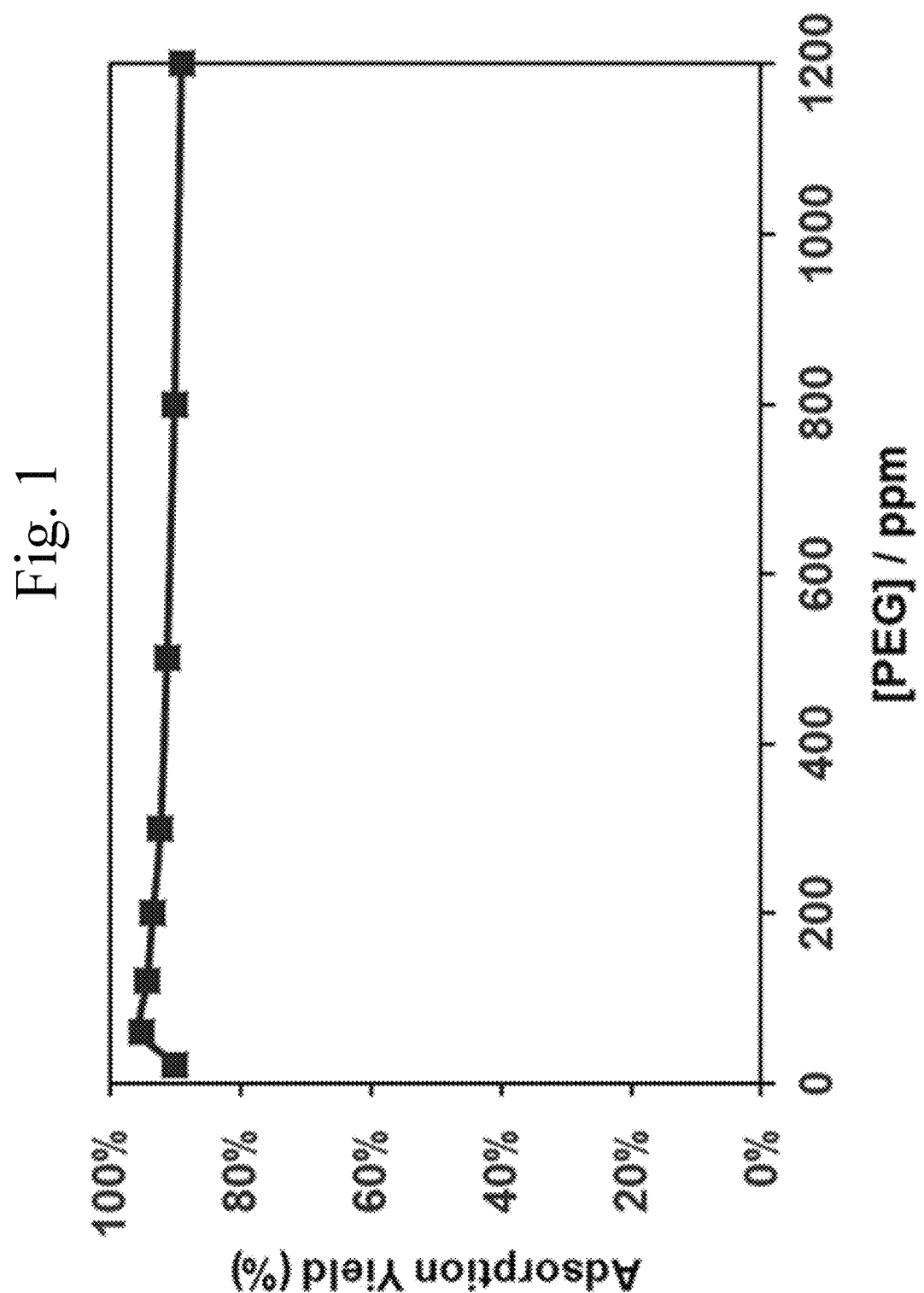
FIG. 1 shows adsorption of antibiotics at varied concentration onto inventive HNT materials from contaminated milk in a preconcentration column at 30° C.

Aspects of the invention provide methods of removing one or more antibiotics from a dairy product, including, for example, whole milk (3.5%), skim milk (0, 0.1, 0.7, or 2%), heavy cream, kefir, etc., which methods may comprise: passing the dairy product comprising an antibiotic (or mixture of 2, 3, 4, 5, 6, 7, or more antibiotics) in a first amount through a bulk comprising, relative to a total bulk weight, at least 75, 80, 85, 90, 91, 92, 92.5, 93, 94, 95, 96, 97, 97.5, 98, 99, 99.1, 99.5, or 99.9 wt. % of titanium oxide nanostructures. That is, the bulk may include no more than 20, 15, 10, 7.5, 5, 2.5, 2, 1, 0.5, 0.1, or 0.01 atom. % or mol. %, relative to Ti atoms, of any individual or cumulative other atoms beyond Ti, O, and H. The passing of the dairy product through the bulk, i.e., flowing through the bulk, generally reduces the amount of one or more of the antibiotics in the dairy product(s), i.e., provides the dairy product comprising the antibiotic in a second amount, wherein the first amount is greater than the second amount. The second amount may be, for example, less than 60, 50, 40, 33, 30, 25, 15, 10, 5, 2.5, 1, 0.1, or 0.01% of the first amount. The nanostructures generally have lengths at least two-fold—preferably 3, 4, 5, 6, 10, 20, 25, 33, 40, 50, or 100-fold, in excess of their width and/or height (generally both simultaneously).

That is, the Ti-oxide nanostructures are generally elongated and do not have a planar, sheet like shape, or a contiguous bulk solid crystal, nor are the elongated nanostructures packed into a tightly agglomerated crystalline alignment, but instead loosely entangled in a spaghetti-like arrangement, when viewed on 40 nm scale by TEM.

The titanium oxide nanostructures may have a formula $H_xNa_{2-x}Ti_2O_5.(H_2O)$, wherein $x \leq 2$ (e.g., hydrates of $HNaTi_2O_5$, $H_{0.5}Na_{1.5}Ti_2O_5$, $H_{0.75}Na_{1.25}Ti_2O_5$, $H_{1.25}Na_{0.75}Ti_2O_5$, $H_{1.5}Na_{0.5}Ti_2O_5$, $H_{1.75}Na_{0.25}Ti_2O_5$, $H_{1.2}Na_{0.5}Ti_2O_5$, $H_{1.1}Na_{0.9}Ti_2O_5$, $H_{1.33}Na_{0.67}Ti_2O_5$, $H_{1.4}Na_{0.6}Ti_2O_5$, $H_{1.67}Na_{0.33}Ti_2O_5$, $H_{1.8}Na_{0.2}Ti_2O_5$, $H_{1.9}Na_{0.1}Ti_2O_5$, $H_2Ti_2O_5$, $H_{1.95}Na_{0.05}Ti_2O_5$, etc.). The titanium oxide nanostructures may preferably be nanotubes. The titanium oxide nanostructures may have an average diameter or cross-sectional thickness anywhere in a range of from 5 to 200 nm, e.g., at least 5, 6, 7, 8, 9, 10, 11, 12, 13, 14, 15, 20, 30, 40, or 50 nm and/or up to 200, 175, 150, 125, 110, 100, 90, 80, 75, 70, 65, 60, 55, 50, 45, 40, 35, 30, 25, 20, 15 or 10 nm.

The dairy product, e.g., milk, may be eluted in a carrier having a pH in a range of from 5.0 to 8.0, e.g., at least 5.5, 5.75, 6, 6.1, 6.2, 6.25, 6.3, 6.33, 6.35, 6.4, 6.45, 6.5, 6.55, 6.6, 6.65, 6.7, 6.75, 6.8, 6.85, 6.9, or 6.95 and/or up to 8, 7.75, 7.5, 7.4, 7.33, 7.3, 7.25, 7.2, 7.15, 7.1, 7.05, 7, 6.99, 6.95, 6.9, 6.85, 6.8, or 6.75. For example, the eluting phase, including the dairy product(s) may have such a pH, or the eluting carrier fluid, separate from the dairy product(s), may have such a pH.

The bulk may be present in the form of a stationary phase within a column packed with the bulk. The column may be a pre-concentrating column, an analytical column, and/or a preparative column, with any dimensions as described herein. The bulk may comprise no more than 5, 4, 3, 2.5, 2, 1, 0.5, 0.1, 0.01, 0.001, 0.0001, or 0.00001 wt. % of materials aside from titanium oxide(s), relative to the total bulk weight.

The passing may occur at a pressure in a range of from 2 to 20 bar, e.g., at least 2, 2.5, 3, 3.5, 4, 4.5, 5, 5.5, 6, 6.5, 7, 7.5, 8, 8.5, 9, 9.5, or 10 bar and/or up to 20, 18, 16, 15, 14, 13, 12, 11, 10, 9, or 8 bar. That is, the passing or flow-through of the dairy product(s) through the bulk is generally above standard pressure. The passing may occur at a temperature of at least 15, 18, 20, 22, 24, 25, 27, 30, 35, 40, 45, or 50° C. and/or up to 100, 80, 65, 50, 45, 40, 35, 30, or 25° C.

The first amount of the antibiotic, which may generally be the initial degree of contamination of the dairy product (e.g., milk) may be in a range of from 10 to 1200 ppm, e.g., at least 10, 15, 20, 30, 40, 50, 100, 150, 250, or 500 ppm and/or up to 5000, 2500, 1250, 1200, 1100, 1000, 900, 800, 700, 600, 500, 400, 350, or 300 ppm. The second amount of the antibiotic, reached immediately after the passing, i.e., after exiting the bulk, may be no more than 15% of the first amount. The second amount of antibiotic in the dairy product(s) generally corresponds to the purified amount, though may represent an intermediate purity level for samples subjected to 2, 3, 4, 5, or more, passings through bulk(s).

The passing may comprise removing no more than 4, 3, 2.5, 2, 1, 0.5, 0.1, 0.01, 0.001, 0.0001, or 0.00001 wt. % of original amounts of non-antibiotic components of the dairy product, such as protein(s), oligopeptide(s), amino acid(s), fat(s), oil(s), (poly, oligo) saccharide(s), mineral(s), vitamin(s), etc., individually or cumulatively. Aspects of the invention provide separative selectivity towards antibiotics and/or non-removal of naturally-occurring organic and/or inorganic components of dairy products, such as milk. For example, under standard MPLC and HPLC conditions, inventive materials, stationary phases, and columns may effectively separate antibiotics, particularly β-lactam antibiotics with a selectivity factor, α, of 0.9, 0.85, 0.8, 0.75, 0.7, 0.65, 0.6, 0.55, 0.5, 0.45, 0.4, 0.35, 0.3, or less. Inventive materials may retain such antibiotics, e.g., preferably to, or rather than, retaining and/or removing milk and/or its inorganic components, including calcium, copper, iron, magnesium, manganese, phosphorus, potassium, selenium, sodium, and/or zinc, and/or other organic components, such as amino acids (including alanine, arginine, aspartic acid, cystine, glutamic acid, glycine, histidine, isoleucine, leucine, lysine, methionine, phenylalanine, proline, serine, threonine, tyrosine, tryptophan, and/or valine), oligopeptides, proteins, fats/oils, such as cholesterol, saturated fatty acids (4:0, 6:0, 8:0, 10:0, 12:0, 13:0, 14:0, 15:0, 16:0, 17:0, 18:0, 20:0), monounsaturated fatty acids (14:1, 15:1, 16:1, 16:1 cis, 17:1, 18:1, 18:1 cis, 18:1 trans), polyunsaturated fatty acids (18:2 unspecified, 18:2o-6,cis,cis, 18:2 i, 18:3 unspecified, 18:3o-3,cis,cis,cis), polysaccharides, oligosaccharides, glycosides, lactose, and/or vitamins, including vitamin A, thiamin (vitamin B1), riboflavin (vitamin B2), niacin (vitamin B3), pantothenic acid (vitamin B5), pyridoxine (vitamin B6), cobalamin (vitamin B12), vitamin C, vitamin D, vitamin E, folic acid/folate, and/or vitamin K. The selectivity factor, α, is equal to $k_B/k_A$, or $(t_{r,B}-t_m)/(t_{r,A}-t_m)$, wherein $t_m$ is time spent in mobile phase, $t_r$ is total time spent on column, and k is the retention factor, whereby solute A has the shorter retention time, i.e., when two solutes elute with identical retention time, α is 1.00, and for all other conditions α>1. The difference in retention times of the antibiotic(s) to respective dairy product components may be, for example, 95, 90, 85, 80, 75, 70, 67, 65, 60, 55, 50, 45, 40, 33, 25, 20, 15, 10%, or greater differences. Alternatively, or in addition to this type of separation, inventive materials, stationary phases, and columns may, relative to all materials retained, at least 50, 60, 70, 75, 80, 85, 90, 91, 92, 92.5, 93, 94, 95, 96, 97, 97.5, 98, 99, 99.1, 99.5, or 99.9 wt. % antibiotic(s).

The bulk may comprise no fiber support, e.g., no mineral wools, no polymers, no sol-gels, etc., and may consist essentially of the titanium oxide nanostructure. That is, the bulk may contain no components which alter the fixation and/or separation efficiency of the stationary phase by more than 5, 4, 3, 2.5, 2, or 1%.

Aspects of the invention comprise columns, comprising: a stationary phase comprising at least 90, 91, 92, 92.5, 93, 94, 95, 96, 97, 97.5, 98, 99, 99.1, 99.5, or 99.9 wt. % of titanium oxide nanostructures or nanotubes, relative to a total weight of the stationary phase, wherein the titanium oxide has a formula $H_xNa_{2-x}Ti_2O_5 \cdot (H_2O)$, wherein x≤2 in any permutation described herein. The nanotubes may have an average diameter in a range of from 5 to 200 nm, or the nanostructures/tubes may have any morphology described herein.

The titanium oxide nanotubes used in inventive methods, columns, stationary phases, or materials, may have a BET surface area in a range of from 125 to 225 m²/g, e.g., 125, 130, 135, 140, 145, 150, 155, 160, 165, 170, 175, 180, 185, 190, 195, 197.5, 200, 202.5, 205, or 210 m²/g and/or up to 250, 235, 225, 220, 215, 210, 205, 200, 195, 190, 185, 180, or 175 m²/g. The titanium oxide nanotubes used in inventive methods, columns, stationary phases, or materials, may have an average pore size in a range of from 65 to 85 Å, e.g., at least 62.5, 65, 67.5, 69, 70, 71, 72, 73, 74, 75, 76, or 77.5 Å and/or 90, 87.5, 85, 82.5, 80, 79, 78, 77, 76, 75, 74, 73, or 72.5 Å. The titanium oxide nanotubes used in inventive methods, columns, stationary phases, or materials, may have an average particle size (i.e., agglomerations of nanostructures) in a range of from 60 to 125 μm, e.g., at least 60, 65, 70, 75, 80, 85, 90, 95 or 100 μm and/or up to 150, 135, 125, 120, 115, 110, 105, 100, 95, 90, or 85 μm.

The titanium oxide nanotubes may have an anatase crystal structure, e.g., at least 75, 80, 85, 90, 91, 92, 92.5, 93, 94, 95, 96, 97, 97.5, 98, 99, 99.1, 99.5, or 99.9 wt. % of a total weight of the titanium oxide may be in anatase phase.

Inventive columns may have a length in a range of from 10 to 30 cm, e.g., at least 8, 10, 11, 12, 12.5, 13, 14, 15, 16, 17, 17.5, 18, 19, or 20 cm and/or up to 40, 35, 30, 27.5, 25, 22.5, 20, 17.5, or 15 cm. Inventive columns may have an internal diameter in a range of from 1 to 10 cm, e.g., at least 1, 1.5, 2, 2.5, 3, 3.5, 4, 4.5, 5, 5.5, 6, 6.5, 7, or 7.5 cm and/or up to 15, 14, 12.5, 12, 10, 9, 8, 7.5, 7, or 6 cm. The stationary phase may comprise no more than 1, 0.5, 0.1, 0.01, 0.001, 0.0001 wt. % of organic polymer and graphite.

Useful flow rates for methods or columns described herein may be, for example, at least 0.1, 0.2, 0.3, 0.4, 0.5, 0.6, 1, 1.2, 2.4, 5, 6, 8, 10, 15, 20, 25, 30, 35, 40, 60, 120, 240, 480, 960, or 1200 mL per minute and/or up to 5, 4, 3, 2, 1.5, 1, 0.8, or 0.5 L per minute.

Aspects of the invention include mixtures, comprising: titanium oxide nanotubes having a formula $H_xNa_{2-x}Ti_2O_5 \cdot (H_2O)$ wherein x≤2; an antibiotic; and one or more of any of the dairy products described herein, wherein the nanotubes have any average diameter described herein. Relevant antibiotics herein may be penicillins, cephalosporins, polymyxins, rifamycins, lipiarmycins, quinolones, sulfonamides, macrolides, lincosamides, tetracyclines, cyclic lipopeptides (such as daptomycin), glycylcyclines (e.g., tigecycline), oxazolidinones (e.g., linezolid), and/or lipiarmycins (such as fidaxomicin). In the inventive mixtures, the dairy product may preferably be milk and/or the antibiotic may preferably be β-lactam antibiotic. Any of the classes of antibiotics described herein may be treated by methods and/or columns as described herein, though particular methods may apply to only certain classes or compounds.

Inventive materials comprise at least 60, 70, 75, 80, 85, 90, 91, 92, 92.5, 93, 94, 95, 96, 97, 97.5, 98, 99, 99.1, 99.5, or 99.9 wt. % of the total active column material weight, of titanium oxide. Inventive materials may contain no graphene, only trace amounts (e.g., no more than that which is capable of detection, that commonly present as a residual in sources of desired materials, or the like), or may comprise no more than 22.5, 20, 17.5, 15, 10, 7.5, 5, 4, 3, 2, 1, or 0.5 wt. %, relative to the total active column material (or nanomaterial) weight, of graphene, activated carbon, fullerenes, and/or other carbon-based materials, either individually or in combination. Inventive materials may exclude organic monomers (particularly radically polymerizable monomers), including, e.g., acrylates, methacrylates such methacrylic acid, glycidyl methacrylate, etc., styrenics, olefins, and/or acrylonitrile, or contain only trace amounts of one or more of any of these, or may comprise no more than 20, 17.5, 15, 12.5, 10, 7.5, 5, 4, 3, 2, 1, or 0.5 wt. %, relative to the total active column material weight, of one or more of any or all of such organic monomers individually or in any combination.

Inventive materials need not be good adsorbents for Cs or Sr, and in certain cases may not adsorb such metals or may not absorb them sufficiently relative to a placebo. Inventive materials may exclude, include only trace amounts of Si, Li, and/or K, e.g., no more than 5, 4, 3, 2.5, 2, 1, 0.5, 0.1, 0.01, 0.001, 0.0001, or 0.00001 atom. %, relative to the total nanomaterial composition, of Si, Li, and/or K, individually or in any combination. Inventive materials may exclude or include only trace amounts of $SiO_2$ and/or $Fe_3O_4$ or, e.g., may comprise no more than 15, 10, 7.5, 5, 4, 3, 2, 1, 0.5, 0.1, or 0.01 wt. %, relative to the total nanomaterial weight, of $SiO_2$ and/or $Fe_3O_4$, either individually or in combination. Inventive materials are generally non-magnetic, and can function optimally for separations without relying on magnetism, though excluding magnetism is not a requirement.

Columns containing the inventive stationary phase require no fiber support and may exclude polymer support networks, addition, condensation, and/or radically-polymerized polymers, such as a polyolefin (e.g., PE-LDPE, LLDPE, HDPE, UHDPE, etc., PP, PB, PIB, etc.), polyamide, polyimide, polyester, PS, ABS, PAN, PES, PEEK, PVC, PU, PAN, polychloroprene, and/or fluoropolymer (PTFE, PVDF, PHFP, PCTFE, etc.). Inventive column packings generally include no more than 40, 33, 25, 20, 15, 10, 7.5, 5, 4, 3, 2, 1, or 0.5 wt. %, relative to the total stationary phase weight, of any one or more of the aforementioned polymers and/or groups of polymers.

Aspects of the invention provide methods of selective extraction from dairy products, such as milk, of antibiotics, particularly β-lactams, including, e.g., penicillin G, penicillin K, penicillin N, penicillin O, penicillin V, methicillin, nafcillin, oxacillin, cloxacillin, dicloxacillin, flucloxacillin, ampicillin, amoxicillin, pivampicillin, hetacillin, bacampicillin, metampicillin, talampicillin, epicillin, carbenicillin, ticarcillin, temocillin, mezlocillin, piperacillin, azlocillin, clavulanic acid, sulbactam, and/or tazobactam (or the classes of β-lactamase-resistant, β-lactamase inhibitors, aminopenicillins, carboxypenicillins, and/or ureidopenicillins), using inert $TiO_2$ nanomaterials. The extraction of antibiotics may employ solid phase extraction in dynamic conditions using a preconcentration column.

The materials adsorbed onto the inventive materials, stationary phases, or columns may preferably be at least 50, 60, 70, 75, 80, 85, 90, 91, 92, 92.5, 93, 94, 95, 96, 97, 97.5, 98, 99, 99.1, 99.5, or 99.9 wt. % antibiotics and little to no sugars, fats, proteins, saccharides, and/or milk flavor components. Substances preferably not retained by inventive materials may include any of those dairy product components discussed above, including (particularly in the case of milk): milk proteins, lactose, lipids, fats, amino acids, e.g., tryptophan, threonine, isoleucine, leucine, lysine, methionine, cysteine, phenylanine, tyrosine, valine, arginine, histidine, alanine, aspartic acid, glutamic acid, glycine, proline, and/or serine; and/or minerals such as calcium, iron, and/or magnesium.

An aspect of the invention includes solutions and/or materials for solid phase extraction of antibiotics using $TiO_2$ with controlled morphologies, such as nanotubes, nanowires, nanorods, and nanospheres. The $TiO_2$ may be one or more types of nanotubes with tuned properties, including granular size, intergranular pores, and/or polarity (e.g., due to hydroxyl groups and/or other functionalization, defects, etc.). The sorption of antibiotics on the surface of $TiO_2$ nanotubes in dynamic conditions may be modified. Aspects of the invention apply $TiO_2$ nanostructured materials, optionally in a preconcentration column, under dynamic conditions, preferably for selective separation of antibiotics, such as Penicillin G, at trace levels from contaminated milk. Aspects of the invention comprise methods of treating water and/or dairy products, including milk (skim, low-fat, whole), condensed milk, evaporated milk, eggnog, kefir, yoghurt, buttermilk, sour cream, condensed cream, whipping cream, ayran, infant formula, creme fraiche, fresh cheeses, curds, quark, etc. Milk (or generally dairy) factories, water treatment plants, may be provided using inventive materials and/or methods described herein.

An aspect of the invention involves tuning the polarity of $TiO_2$ nanotubes/nanomaterials, e.g., by decorating them by fullerenes, i.e., $C_{60}$, and/or surface modified fullerenes, such as polyhydroxyfullerene molecules, i.e., $C_{60}(OH)_n$, wherein n is 1 to 15, and/or cyclodextrins, such as α (alpha)-cyclodextrin (6 glucose subunits), β (beta)-cyclodextrin (7 glucose subunits), or γ (gamma)-cyclodextrin (8 glucose subunits).

An aspect of the invention provides physical mixture(s) of $TiO_2$ nanotubes or nanoparticles with clays or zeolites, for example, with controlled acidity, Si/Al ratio, and/or porosity (from micro to mesoporous). The porosity may be, for example, "microporous," i.e., pore diameters less than 2 nm, e.g., down to 0.001, 0.005, 0.01, 0.025, 0.05, 0.1, 0.2, 0.25, 0.3, 0.33, 0.35, 0.4, 0.45, 0.5, 0.55, 0.6, 0.67, 0.75, 0.85, 0.95, 1, 1.1, 1.2, 1.25, or 1.5 nm and/or no more than 2, 1.9, 1.8, 1.75, 1.67, 1.6, 1.5, 1.4, 1.33, 1.25, 1.2, 1.1, 1, 0.9, 0.8, 0.75, 0.67, or 0.5 nm, and/or "mesoporous," i.e., having pore diameters within a range of from 2 nm and 50 nm, e.g., at least 2, 2.5, 3.33, 5, 6, 6.67, 7.5, 8.5, 10, 12.5, 15, 17.5, 20, 22.5, or 25 nm and/or up to 50, 47.5, 45, 42.5, 40, 37.5, 35, 33.3, 32.5, 30, 27.5, 25, 22.5, or 20 nm, or macroporous materials having pore diameters of greater than 50 nm, e.g., at least 52.5, 55, 57.5, 60, 62.5, 65, 66.7, 70, 75, 85, 100, 125, 150, 175, 200, 250, 375, or 500 nm but generally not more than 250, 200, 150, 100, 50, 25, 10, 5, or 1 μm, though higher pore sizes may be present. Relevant pore distributions may be Gaussian, monomodal, bimodal, trimodal, tetramodal, or more.

Relevant methods of synthesis of titanium oxide nanostructures may include various hydrothermal or other methods. Exemplary hydrothermal methods may use autoclaves or other sealed, strong-walled, heatable containers as crystallization vessels. These may include thick-walled (e.g., at least 5, 7.5, 10, 12.5, 15, 17.5, 20, 25, 30, 35, 40, or 50 mm and/or up to 100, 90, 80, 75, 70, 60, 50, 40, or 30 mm) steel cylinders with a hermetic seal suitable to withstand high temperatures (e.g., at least 300, 325, 350, 375, 400, 450, 500, 550, 600, or 650° C. and/or up to 1250, 1200, 1150, 1100, 1000, 900, 800, 700, 600, or 500° C.) and pressures (e.g., at least 10, 25, 50, 75, 100, bar and/or up to 10,000, 7,500, 5,000, 3,500, 2,500, 2,000, 1,500, 1,000) for prolonged periods of time. Autoclaved materials should generally be inert with respect to the solvent, which is often at least 50, 60, 70, 75, 80, 85, 90, 92.5, 95, 97.5, 98, or 99 wt. % water. Seals for the reactor may include the Bridgman seal, and protective inserts and/or coating may be used in hydrothermal syntheses to prevent corrosion of the internal cavity of the autoclave. Particularly inner coatings or jackets may be contact-type or floating, and/or made of carbon-free iron, copper, silver, gold, platinum, titanium, glass (or quartz), and/or PTFE, depending on the temperature and/or solution used.

The hydrothermal method may include a temperature-difference method, achieving supersaturation by reducing the temperature in the crystal growth zone, placing the starting material(s) in a lower part of the autoclave filled with a specific amount of solvent, heating the autoclave to create two temperature zones and dissolve the starting material(s) in the hotter zone, and transporting the saturated (e.g., aqueous) solution in the lower part to the upper part by convective motion. Cooler and denser portions of solution in the upper part of the autoclave may descend while counterflow solution ascends, the solution becoming supersaturated in the upper part as a result of reducing temperature to begin crystallization.

The hydrothermal method may include a temperature-reduction method, achieving crystallization without a temperature gradient between the growth and dissolution zones. In temperature-reduction, supersaturation is achieved by gradual temperature reduction of the solution in the autoclave.

The hydrothermal method may include a metastable-phase method, achieving crystallization based on solubility differences between the growing phase and the starting material phase. The starting material may include thermodynamically unstable compounds (under the growth conditions), whereby when the solubility of the metastable phase exceeds that of the stable phase, and the stable phase crystallizes due to the dissolution of the metastable phase.

Aspects of the invention may provide extraction, preferably dynamic extraction, of one or more antibiotics, such as Penicillin G, Penicillin K, Penicillin V, Penicillin O, Aminopenicillin, Carboxypenicillins, and/or Ureidopenicillins, in particular Penicillin G from milk, using $TiO_2$ nanomaterials. The nanomaterial used for extraction may include titanium oxide nanotubes with formula $H_xNa_{2-x}Ti_2O_5 \cdot H_2O$, wherein x is less than or equal to, e.g., 2, 1.9, 1.8, 1.7, 1.6, 1.5, 1.4, 1.3, 1.25, 1.2, 1.1, 1, 0.9, 0.8, 0.75, 0.7, 0.6, or 0.5. The average diameter of the nanotubes may be, for example between 5 and 200 nm, preferably between 5 and 10 nm, e.g., any of these endpoints and/or at least 1, 2, 3, 4, 5, 7.5, 10, or 15 nm and/or up to 175, 160, 150, 140, 130, 120, 110, 100, 90, 85, 75, 65, 55, 50, 45, 40, 35, 30, 25, 20, 17.5, 15, 12.5, or 7.5 nm.

Useful calcination temperatures of the nanomaterial may be, e.g., between 200 and 700° C., or between 300 and 500° C. For example, the calcination temperatures useful for preparing inventive titanium oxide comprising nanostructures may be any of these endpoints and/or at least 215, 230, 240, 250, 260, 270, 275, 280, 285, 290, 295, 305, 315, 330, 340, 350, 375, or 400° C. and/or up to 800, 750, 725, 705, 675, 650, 625, 600, 575, 550, 525, 505, 485, 475, 465, 450, 425, or 400° C.

Inventive $TiO_2$ nanowires, nanospheres, and/or nanotubes may include hydroxyl groups/defects, e.g., on the surface of the nanostructures, and thus polar surface. For example, inventive materials, nanowires or otherwise, may have one hydroxyl group (or fluoride and/or other functional group) per 1, 2.5, 5, 7.5, 10, 15, 20, 25, 50, 100, 150, 200, 250, 500, or 1000 $nm^2$.

Inventive materials may be packed into columns, pre-columns, or combinations of these, with such units having a length between 10 and 20 cm, e.g., at least 7, 8, 9, 10, 11, 12, 13, or 14 cm and/or up to 30, 25, 20, 18, 16, or 14 cm long, and a diameter varying between 4 and 10 mm, e.g., at least 2, 3, 4, or 5 mm and/or up to 15, 14, 12.5, 12, 10, 8, or 6 mm in diameter. Such (pre-)column(s) may be packed with $H_xNa_{2-x}Ti_2O_5 \cdot H_2O$ powder, x being at least 2, 1.95, 1.9, 1.85, 1.8, 1.75, 1.7, 1.65, 1.6, 1.55, 1.5, 1.45, 1.4, 1.35, 1.3, 1.25, 1.2, 1.15, 1.1, 1.05, 1, 0.95, 0.9, 0.85, 0.8, 0.75, or 0.5. The $H_xNa_{2-x}Ti_2O_5 \cdot H_2H$ powder may have an average particle size varying between 60 and 125 μm, e.g., at least 50, 52.5, 55, 57.5, 60, 62.5, 65, 67.5, 70, 75, 80, 85, 90, 95, or 100 μm and/or up to 150, 145, 140, 135, 130, 125, 122.5, 120, 117.5, 115, 112.5, 110, 105, 100, 95, or 90 μm.

Extractive methods using inventive titanium oxide-containing materials may be conducted at an extraction pH of between 1.75 and 12, though preferably between 6 and 8, or around 6.7, e.g., any of these endpoints and/or at least 2, 3, 4, 5, 5.5, 5.85, 6.25, 6.4, 6.5, 6.6, 6.65, 6.75, 6.8, 6.9, or 7 and/or up to 11, 10, 9, 8.5, 8.25, 7.9, 7.8, 7.7, 7.6, 7.5, 7.4, 7.3, 7.2, 7.1, 7.05, 7, 6.99, 6.95, or 6.9.

Antibiotics may be desorbed from the column, e.g., using an eluent phase comprising organic and/or inorganic acids, preferably inorganic acids: HCl, $HNO_3$, and/or mixtures of inorganic acids. The concentration of the acids may be individually or collectively 5, 10, 15, 20, 25, 30, 33, 40, 50, 60, 70, 75, 80, 85, 90, or 95 wt. % of a total eluent weight.

The column may be regenerated for several cycles, e.g., at least 4, 5, 7, 10, 15, 20, or 25 cycles and/or up to 100, 75, 50, 40, 30, or 25 cycles, using a mixture of inorganic acids such as $H_2SO_4$, HCl, HBr, HI, $HClO_4$, $HBrO_4$, $H_5IO_6$, $HClO_3$, $HBrO_3$, $HIO_3$, $HNO_3$, $H_3PO_4$, $H_2SO_3$, $H_3BO_3$, or a mixture of 2, 3, 4, 5, 6, or more of any of these. Organic acids may additionally or separately be used in treatments, including formic acid, acetic acid, propionic acid, citric acid, glycolic acid, lactic acid, ascorbic acid, trifluoroacetic acid, oxalic acid, glutaric acid, malic acid, tartaric acid, uric acid, phenol, methanesulfonic acid, trifluoromethanesulfonic acid, benzenesulfonic acid, benzoic acid, gallic acid, salicylic acid, toluenesulfonic acid, or a mixture of 2, 3, 4, 5, 6, or more of any of these. In the case of regeneration, the eluent may generally be higher concentration than for antibiotic desorption.

Example 1: Extraction of Penicillin G (PEG) from Milk

Materials Synthesis

Using an alkaline hydrothermal method similar to that described in *J. Environ. Sci.* 2011, 23(5), 860-867, or *J. Phys. Chem. C* 2009, 113(5), 1672-1679, each of which is incorporated by reference in its entirety herein, was used to prepare the titanate nanotubes. Specifically, 3.0 g of $TiO_2$ powder (P25) were treated with 90 mL of 11.25 mol/L NaOH aqueous solution in a 150 mL Teflon-lined autoclave at 130° C. for 20 hours. The resulting precipitate was recovered by filtration and washed with distilled water, then a 0.1 mol/L HCl solution until the pH value of the filtrate solution reached ca. 6.5. This sample was dried at 80° C. for 24 hours to provide a first material, named Na-TNT.

In a second step, an aqueous solution containing Na-TNT is neutralized using a 1 mol/L HCl solution until a pH value of 7 was reached. The material was subsequently washed with 500 mL ultra-pure water to remove excess NaCl formed. The obtained wet solids were dried in an oven at 80° C. for 24 hours. Finally, hydrogenotitanate nanotubes (HNTs) were calcined at 400° C. under air for 2 hours. The BET surface area of the exemplary HNTs nanomaterials was determined to be 203 $m^2/g$ with a pore diameter of 74 Å, and x-ray diffraction (XRD) showed anatase phase with crystallite size of 10 nm. Raman analysis is in good agreement with XRD and transmission electron microscope (TEM) analysis showed nanotubular morphology with an outer diameter of 8 to 10 nm.

BET surface areas of inventive materials may be as above or, for example, at least 180, 185, 190, 195, 197.5, 200, 202.5, 205, 207.5, 201, 215, or 220 $m^2/g$ and/or up to 275, 270, 265, 260, 255, 250, 245, 240, 235, 230, 225, 220, 215, 210, or 205 $m^2/g$. Average pore diameters of inventive materials may be, for example, as above or at least 55, 57.5, 60, 62.5 65, 67.5, 69, 70, 71, 72, 73, 74, or 75 Å and/or up to 100, 95, 90, 85, 82.5, 80, 79, 78, 77, 76, 75, or 74 Å. Average outer diameters of inventive nanotubes may be, for example, at least 6, 6.5, 6.75, 7, 7.15, 7.25, 7.33, 7.5, 7.67, 7.75, 7.8, 7.85, 7.9, 7.95, 8, 8.15, 8.25, 8.33, or 8.5 nm and/or up to 12.5, 12, 11.5, 11.25, 11, 10.75, 10.67, 10.5, 10.33, 10.25, 10.15, 10.05, 10, 9.95, 9.9, 9.85, or 9.75 nm. Inventive titanate materials are generally at least 50, 60, 65, 70, 75, 80, 85, 90, 92.5, 95, 97.5, 98, 99, 99.1, 99.5, or 99.9% anatase.

General Pre-Concentration Column Procedure

Exemplary HNT $TiO_2$ nanotubes ($pH_{PZC}$ 6) were packed into HPLC column (706 mg). The packed column was placed into a vacuum elution apparatus to remove air and insure good packing of the nanomaterial. This solid phase nanomaterial was first conditioned for 4 hours with of diluted HCl (0.1 M) using peristaltic HPLC pump. At a flow rate of 1 mL/min, the pressure developed in the column was stabilized at 118 psi (8 bar). Injections of contaminated milk with increasing antibiotic concentrations, i.e., 10 to 1200 ppm of, for example, Penicillin G, were performed. No Penicillin G peak was detected in the HPLC detector (λ of 210 nm) until a full adsorption capacity of Penicillin G onto HNTs was reached, i.e., the HNTs were saturated. More than 90% of the antibiotic present in the contaminated milk was successfully adsorbed in the pre-concentration column at 30° C., as seen in FIG. 1.

Generalized Titanium Dioxide Synthesis

A hydrothermal method was used for the elaboration of titanate nanostructures using a Doehlert matrix. Specifically, commercial $TiO_2$ (P25, 0.50 g) was dispersed in a 15 mL of aqueous solution of NaOH (10 to 15 mol/L) and placed into a Teflon-lined autoclave. The autoclave was then oven-heated at 130 to 180° C. for 12 to 36 hours. A white precipitate was isolated upon filtration and washed repeatedly with 1000 mL of hot, deionized water until the pH value of the supernatant had attained a value close to 9.

In a second step, an aqueous solution containing the precipitate is neutralized using a 0.1 M HCl solution to a pH value of 7. The precipitate was then subsequently washed with 500 mL of deionized water to remove excess NaCl formed, to yield HNTs. The HNTs are dried for 24 hours at 80° C. For complete sodium elimination, a second washing step was carried out performed using a 1.0 M HCl solution. The solid was then calcined at 400° C. under $O_2$, with a heating rate of 2° C./min, to obtain anatase nanotubes (NT).

The criterion applied for Doehlert matrix resolution are were: maximize the surface area, up to 300 $m^2/g$, and mesoporous volume, up to 1 $cm^3/g$, and minimize the microporous volume. This procedure allowed HNTs elaboration with controlled pore diameter and with a confidence level of 95%.

Depending on the hydrothermal conditions, the average inner diameter of the nanotubes can be from 7 to 200 nm, e.g., at least 7, 8, 9, 10, 11, 12.5, 15, 17.5, 20, 25, 30, 35, 40, 50, 65, 75, or 100 nm and/or up to 200, 190, 180, 165, 150, 140, 130, 120, 110, 100, 95, 90, 85, 80, or 75 nm. For example, nanotubes with an average tube diameter of around 8 nm can be obtained dispersing in 11.25 mol/L NaOH and heating in an autoclave at 130° C. for 20 hours. $TiO_2$ nanotubes can be elaborated via alkaline hydrothermal treatment, for example, transferring 0.5 g of $TiO_2$ P25 (80% anatase, 20% rutile) with 15 mL of NaOH (11.25 mol/L) to a 50 mL Teflon-lined autoclave, and heating in a hydrothermal treatment at 130° C. for 20 hours. The as-formed titanate material was then washed with deionized water and 0.1 mol/L HCl until the final rinsing solution/filtrate had a pH value of 6.5. The solid was then dried at 80° C. for 1 day. For a complete sodium elimination, a second washing step was carried out using a 1.0 M HCl solution. The solid was then calcined at 400° C. under $O_2$ at a heating rate of 2° C./min to obtain anatase nanotubes (NT).

Referring now to the drawings, wherein like reference numerals designate identical or corresponding parts throughout the several views.

FIG. 1 shows a plot of HPLC runs for Penicillin G at different concentrations with a 210 nm detector, showing that full saturation of (reaching Penicillin G adsorption capacity onto) the exemplary HNTs was reached. More than 90% of the antibiotic present in the contaminated milk tested was successfully adsorbed in the preconcentration column at 30° C.

Figure 2:
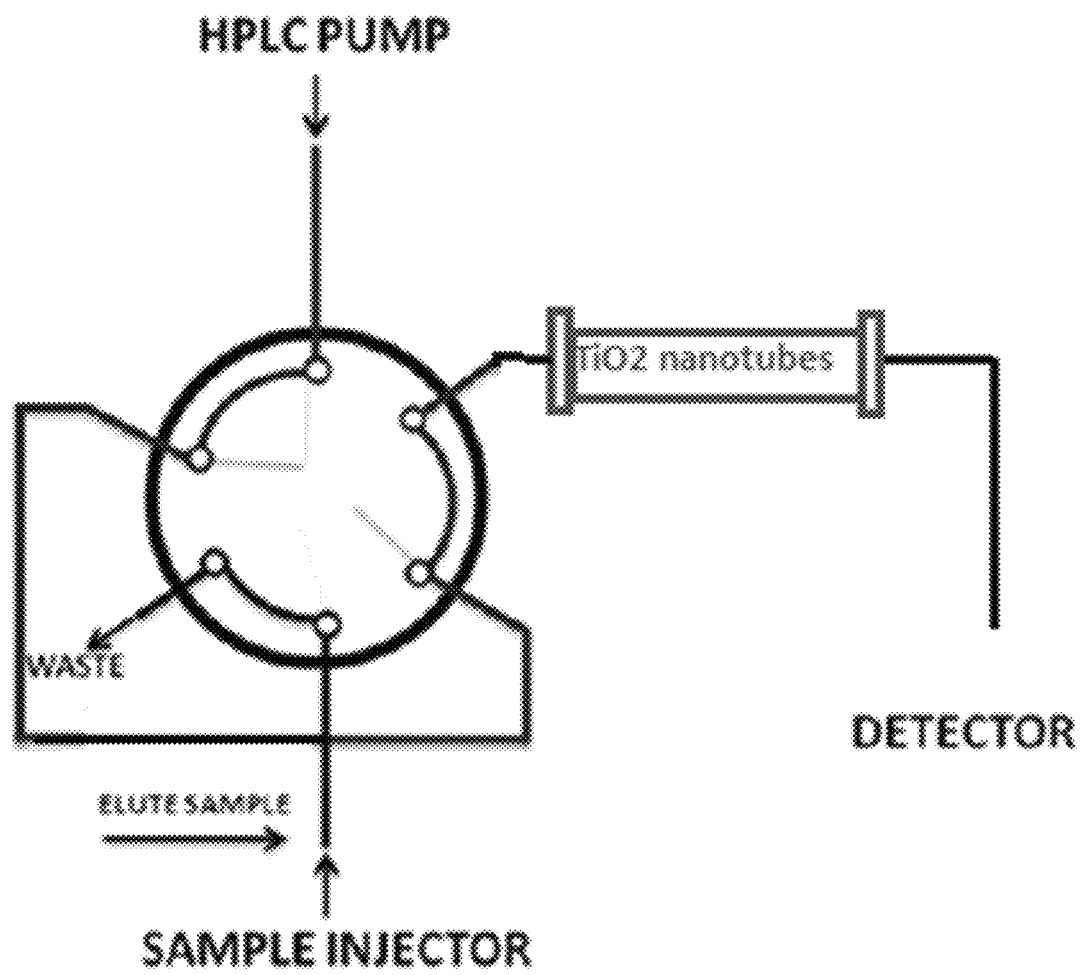
FIG. 2 shows an exemplary sketched layout of an HPLC set-up including a column packed with inventive titanium-comprising nanostructures.
Figure 3A:
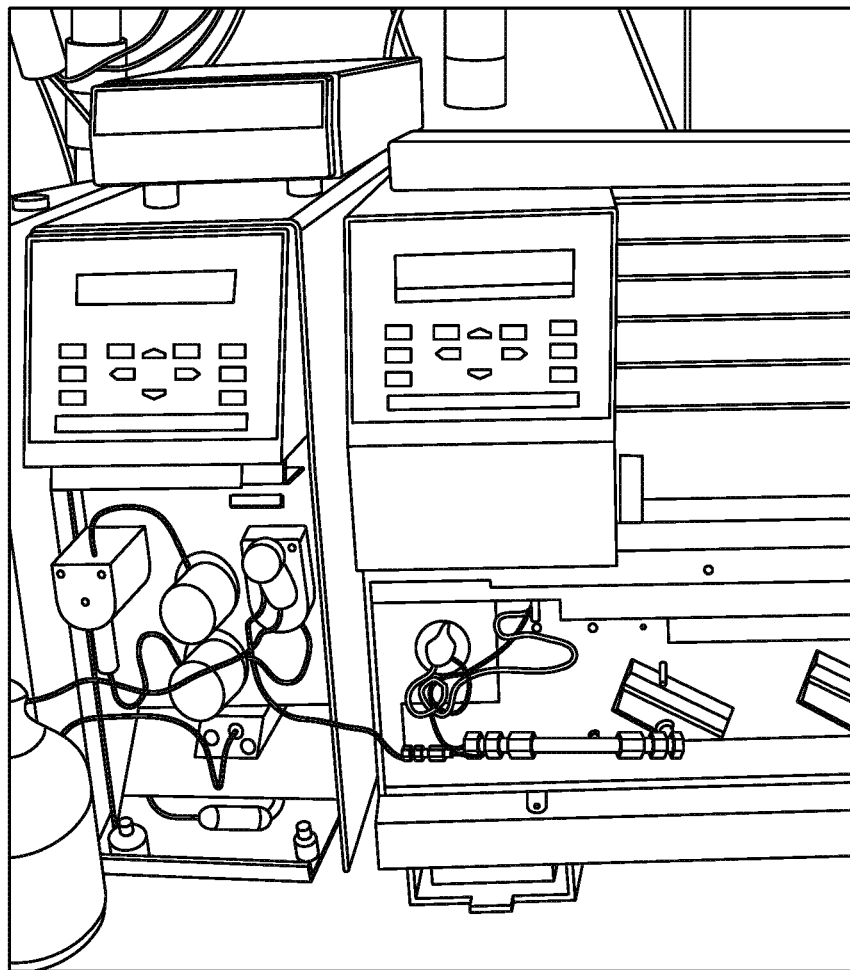
FIG. 3A shows an exemplary layout of an HPLC set-up including a column packed with inventive titanium-comprising nanostructures.
Figure 3B:
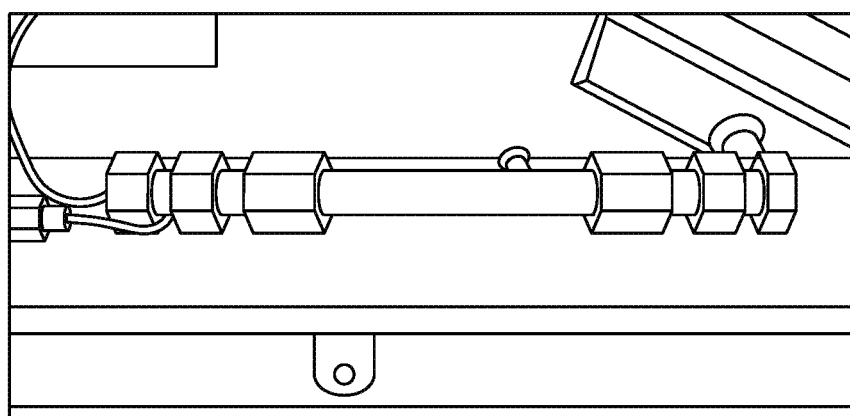
FIG. 3B shows a zoomed-in view of the exemplary layout of an HPLC set-up from FIG. 3A.

FIGS. 2 and 3 show an exemplary layout of an HPLC set-up including a column packed with inventive titanium-comprising nanostructures, in sketched (FIG. 2) and photographic form (FIG. 3). While the set up is shown with a single column, 2, 3, 4, 5, 6, 10, 20, or more columns may be employed, e.g., in parallel (and/or in series), to obtain higher temporal analytical output (and/or higher purity). In addition, preparative columns with correspondingly increased HNT content, e.g., at least 10, 25, 50, 75, 100, 125, 250, 500, 1000, 2500, or 5000 g and/or up to 20, 15, 12.5, 10, 7.5, 5, 4, 3, 2, 1, 0.75, or 0.5 kg. The cross-sectional diameter of columns for pre-concentration, analysis, and/or laboratory preparation may be, e.g., at least 2, 3, 4, 5, 6, 7, 8, 9, 10, 12, 14, 16, 18, or 20 mm and/or up to 35, 30, 25, 20, 18, 16, 15, 14, 13, 12, 11, or 10 mm. The cross-sectional diameter of commercial preparative columns may be, e.g., at least 1, 1.5, 2, 2.5, 4, 5, 6, 8, 10, 12, 14, 16, 18, 20, 25, or 30 cm and/or up to 60, 50, 45, 40, 35, 30, 25, 20, or 15 cm. Pressures of at least 2, 3, 4, 5, 6, 7, 8, 9, 10, or more bar may be used, though useful pressures will generally be under 100, 90, 80, 70, 60, 50, 40, 30, 20, or 10 bar.

Figure 4:
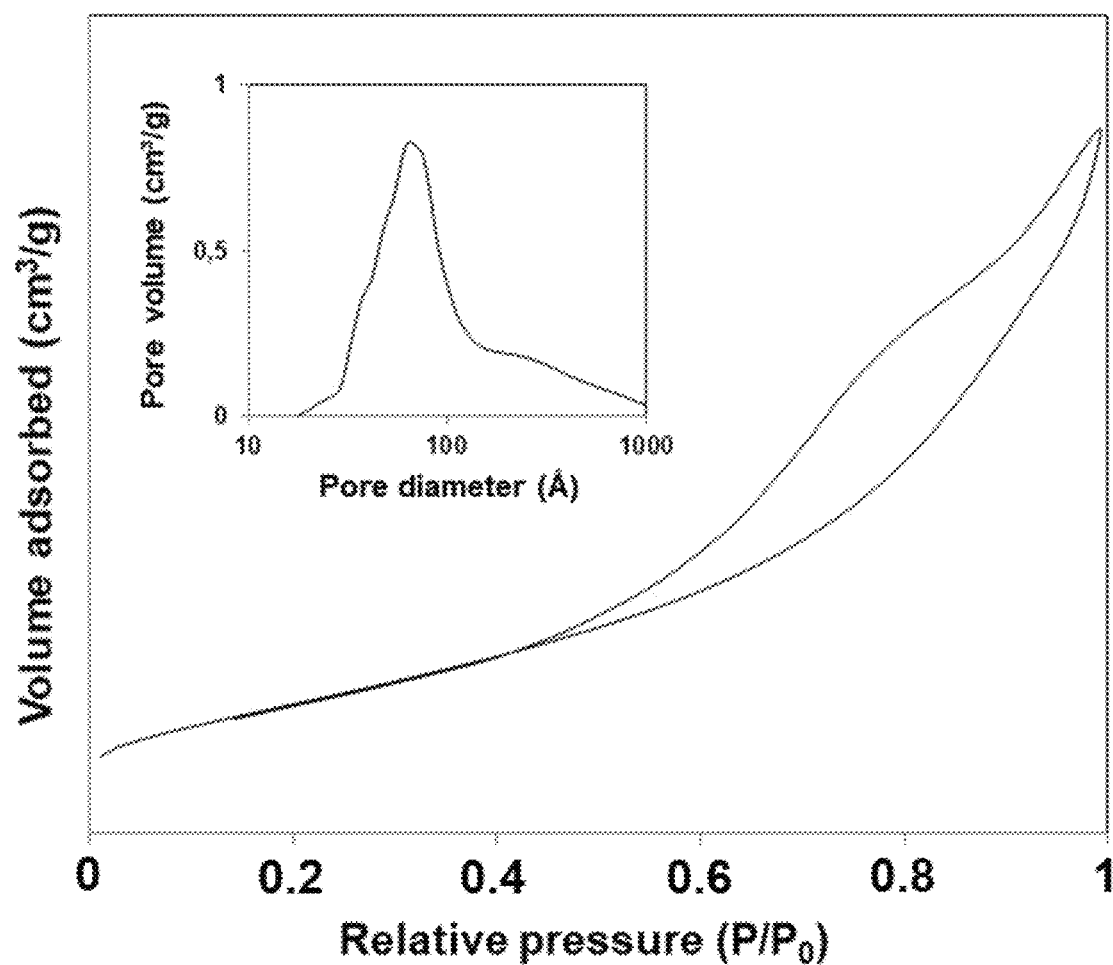
FIG. 4 shows an $N_2$ adsorption-desorption isotherm of exemplary hydrogenotitanate nanotubes (HNTs) calcined at 400° C., designated HNT400, with an inset plot showing the Barrett-Joyner-Halenda (BJH) pore size distribution of HNT400.

FIGS. 4 to 7 shows spectroscopic and analytical characterization data from an exemplary batch of hydrogenotitanate nanotubes (HNTs) calcined at 400° C. as described above, referred to herein as "HNT400." FIG. 4 shows a nitrogen ($N_2$) adsorption-desorption isotherm of HNT400, with an inset figure showing the Barrett-Joyner-Halenda (BJH) pore size distribution of HNT400.

Figure 5:
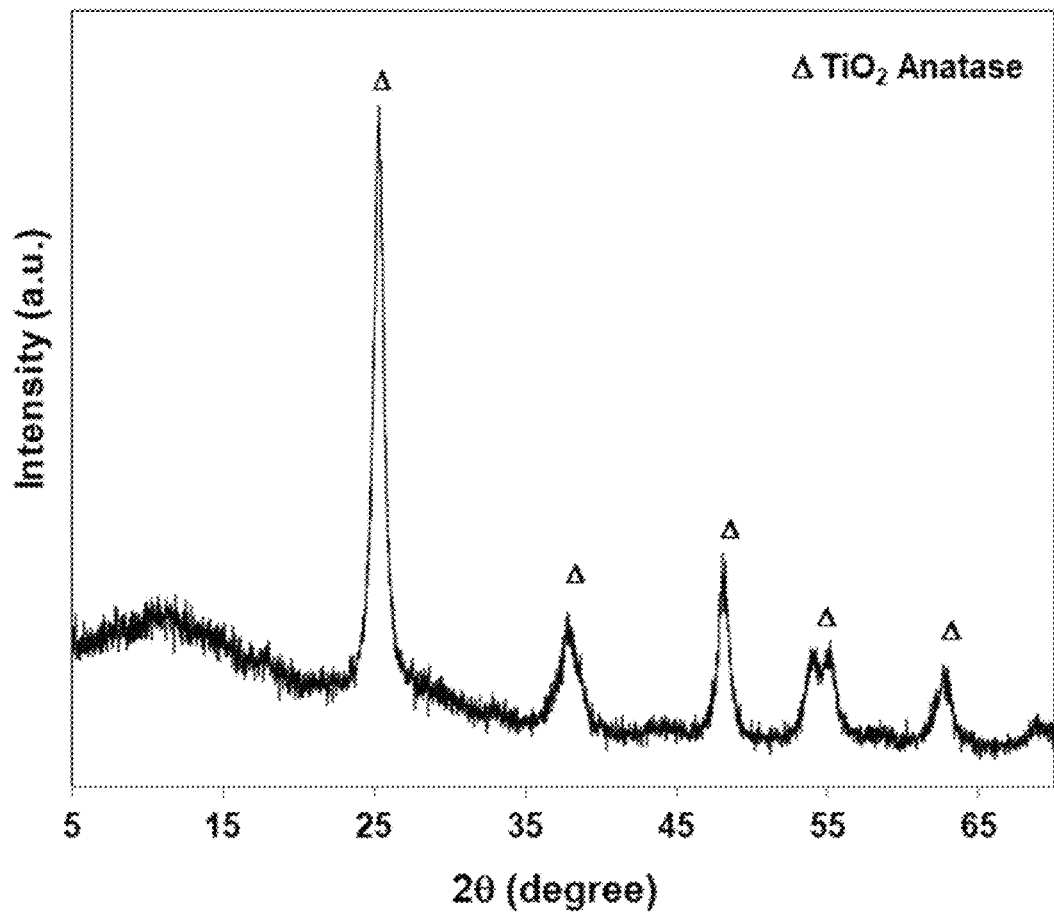
FIG. 5 shows an x-ray diffraction (XRD) pattern of anatase $TiO_2$.

FIG. 5 shows an x-ray diffraction (XRD) pattern of anatase $TiO_2$, showing characteristic peaks at around 25 (most prominent), 37, 47, 53, 55, and 62° 2θ.

Figure 6:
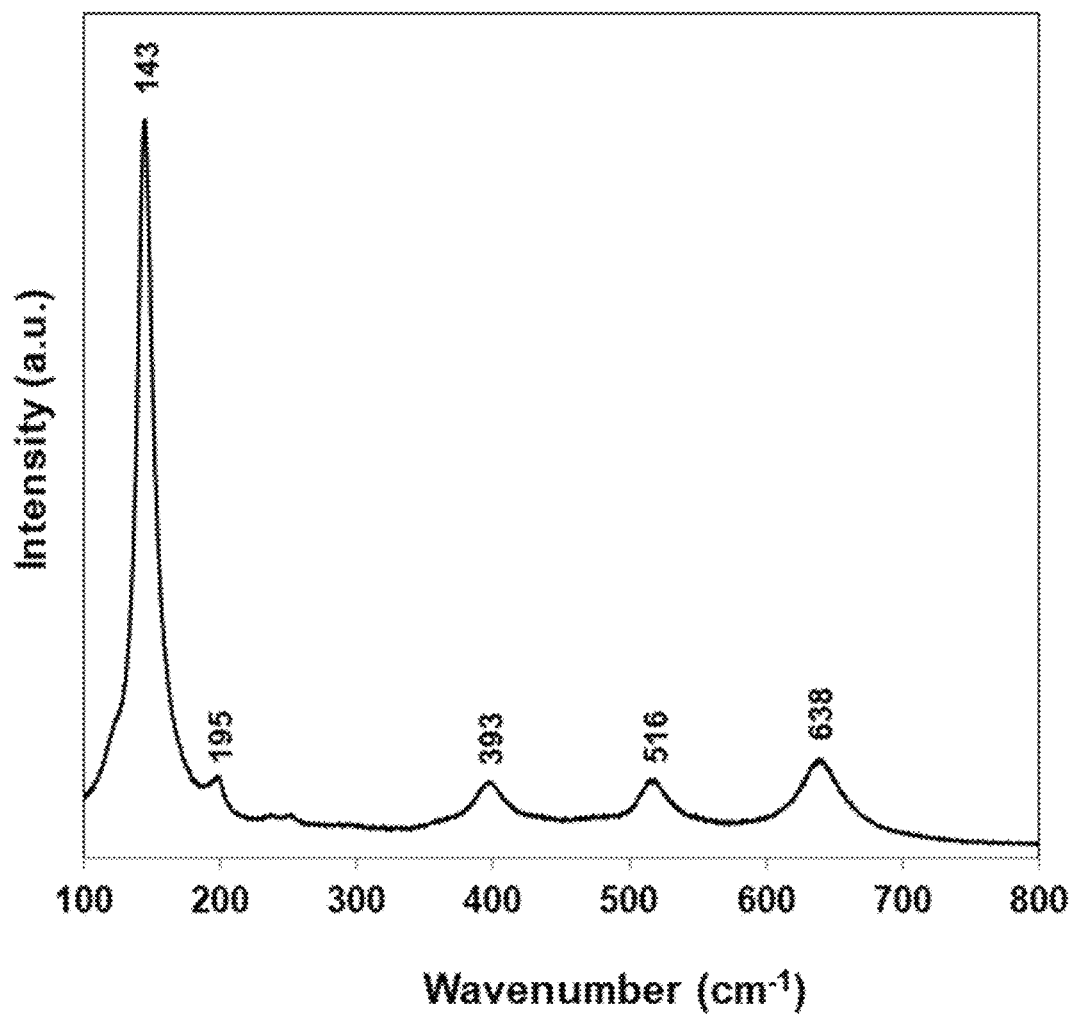
FIG. 6 shows a Raman spectrum of an exemplary HNT400 sample.

FIG. 6 shows a Raman spectrum of an exemplary HNT400 sample, showing signals at 143, 195, 393, 516, and 638 $cm^{-1}$.

Figure 7:
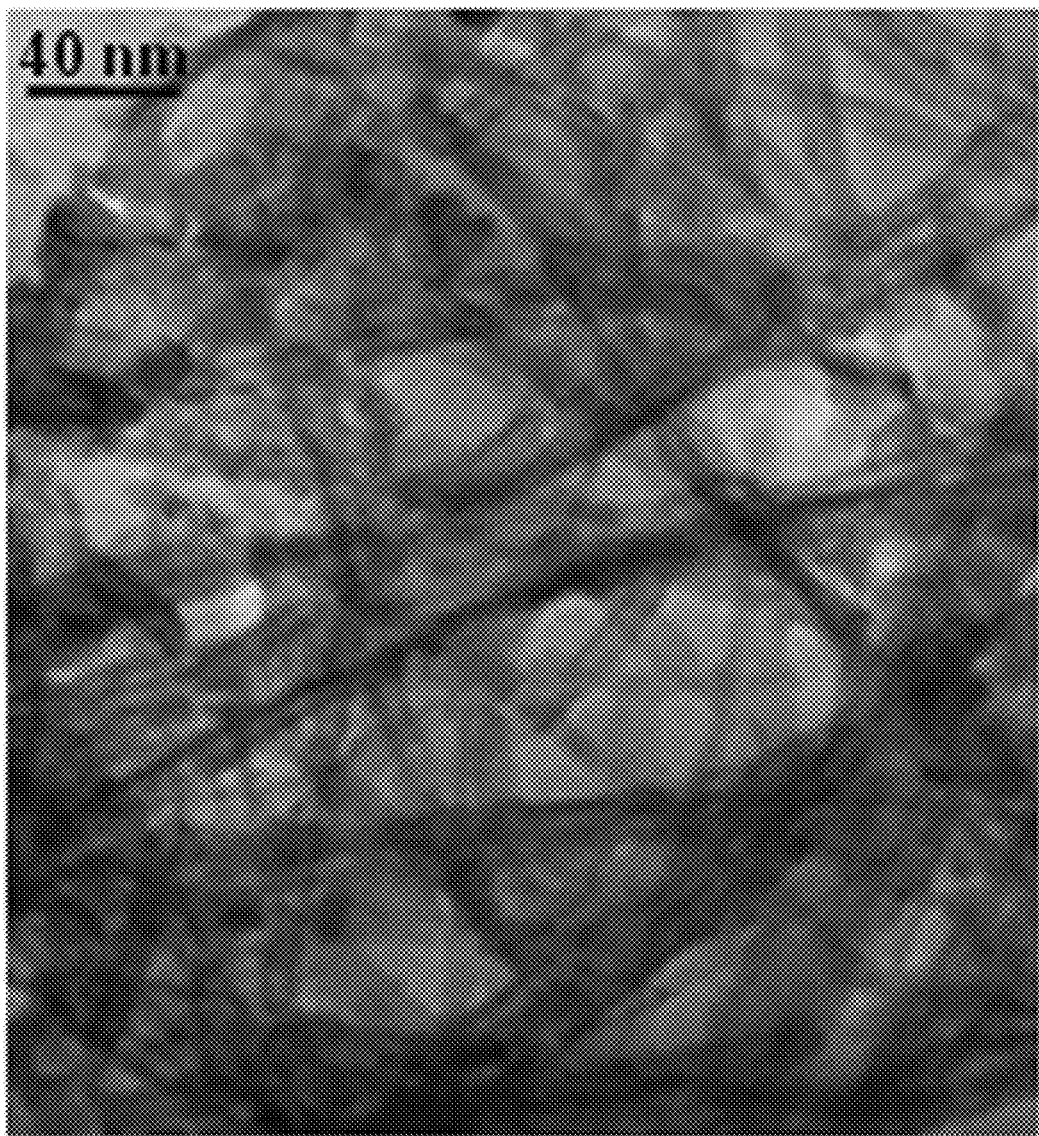
FIG. 7 shows a transmission electron microscope (TEM) image of an exemplary HNT400 sample.
Figure 8:
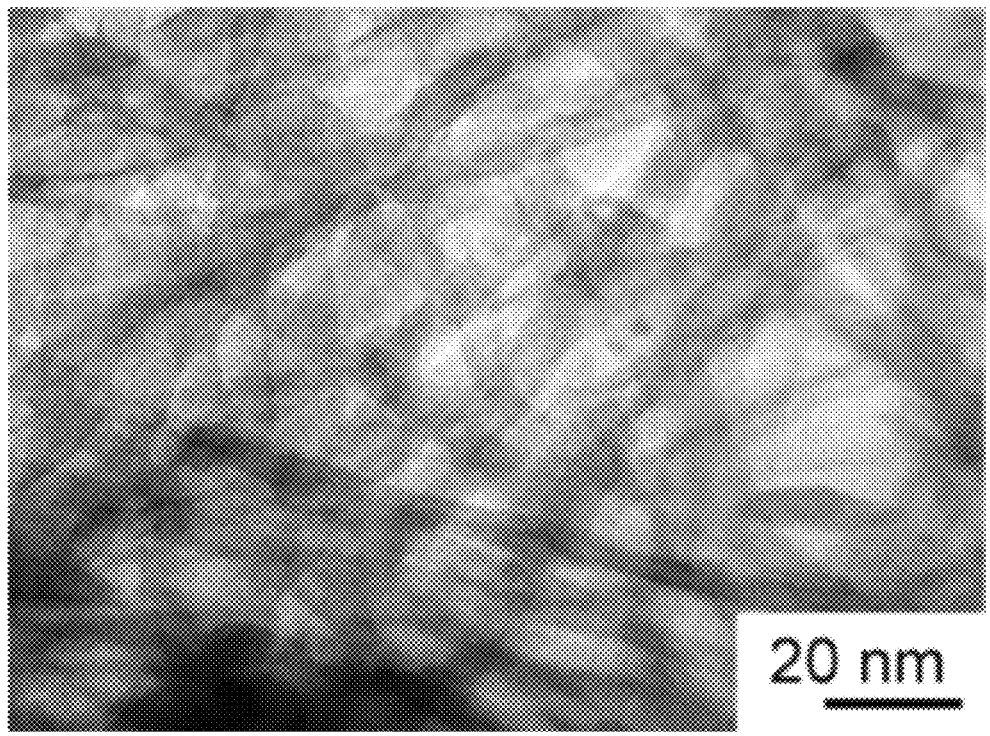
FIG. 8 shows a TEM image of exemplary HNT400 sample at twice the magnification of FIG. 7.

FIG. 7 shows a transmission electron microscope (TEM) image of an exemplary HNT400 sample, while FIG. 8 shows a TEM at twice the magnification of FIG. 7. FIGS. 7 and 8 illustrate that the titanium oxide-comprising nanostructures can have average lengths of at least 325, 350, 375, 400, 425, 450, 475, 500, 550, 600, 650, 700, 750, or 1000 nm, and/or up to 2000, 1750, 1500, 1250, 1200, 1100, 1000, 900, 800, or 750 nm. Depending upon the synthetic conditions, as discussed above, such nanostructures, e.g., nanotubes, may have average outer diameters of at least 5, 7.5, 8, 9, 10, 11, 12, 14, 15, 16, 17, 18, 19, 20, 25, 30, 35, or 40 nm and/or up to 200, 150, 125, 100, 90, 80, 70, 60, 50, 40, 35, 30, 25, 20, or 15 nm.

Figure 9:
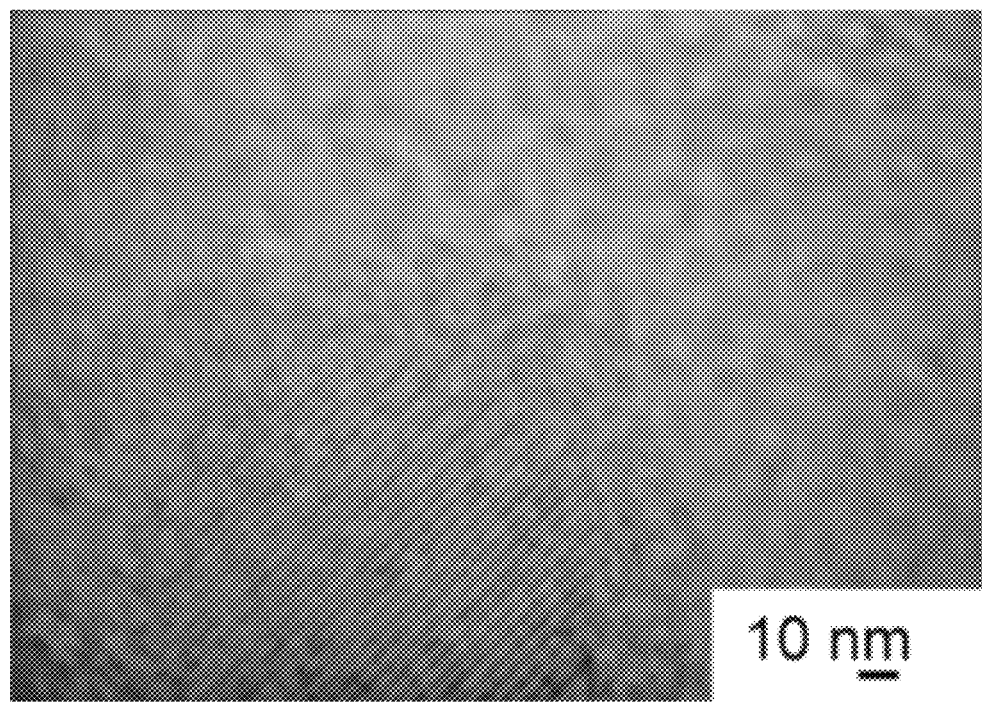
FIG. 9 shows a high resolution transmission electron microscope (HR-TEM) image of the exemplary HNT400 sample from FIG. 8.

FIG. 9 shows a high resolution transmission electron microscope (HR-TEM) image of the exemplary HNT400 sample from FIG. 8.

Figure 10:
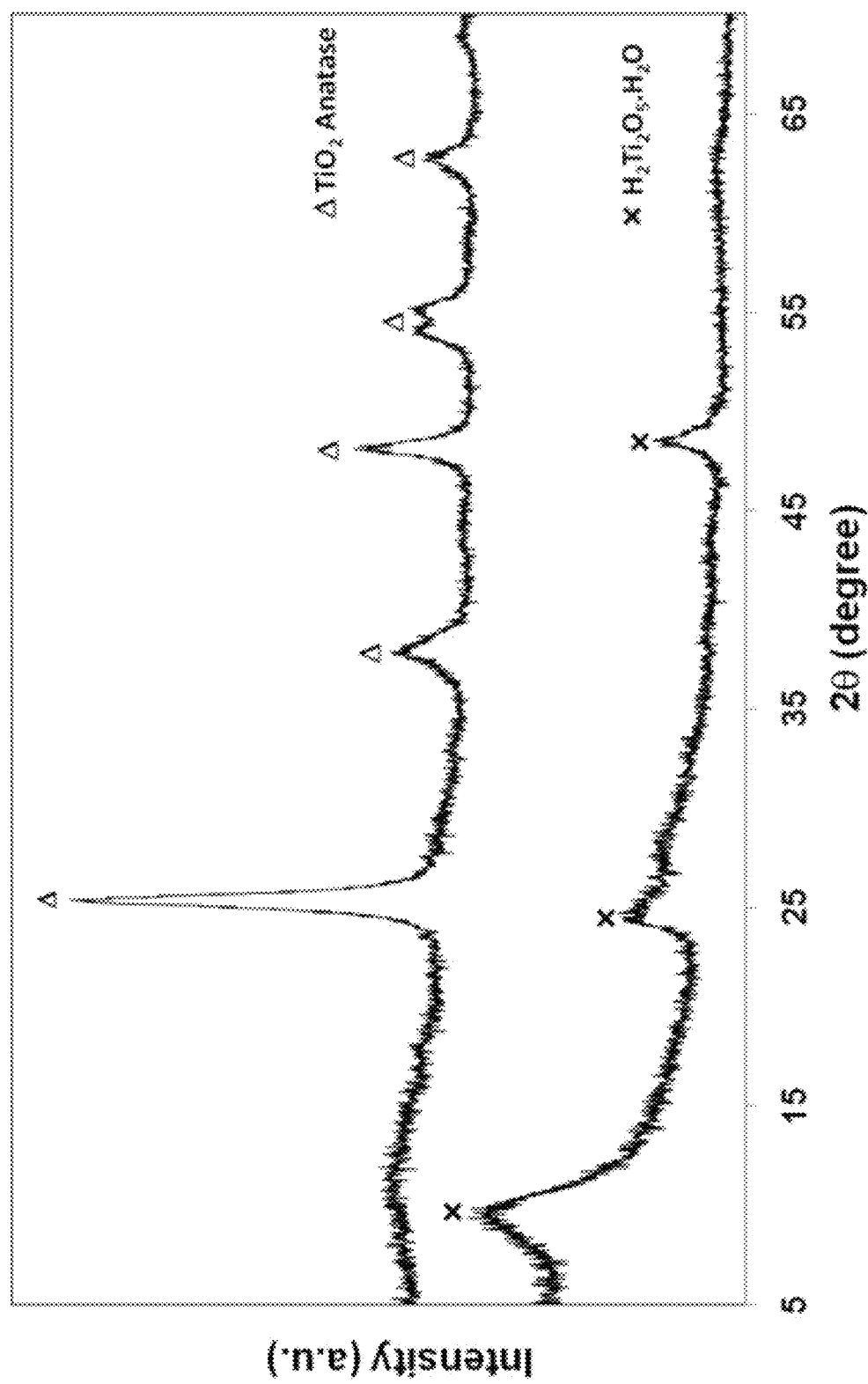
FIG. 10 shows XRD patterns of titanates, i.e., $H_2Ti_2O_5H_2O$ (lower pattern) and anatase $TiO_2$ (upper pattern).

FIG. 10 shows a juxtaposed set of XRD patterns, wherein the upper pattern, having peaks marked with a "delta" (Δ) symbol, shows characteristic diffraction peaks of anatase $TiO_2$ (JCPDS-89-4921), and the lower XRD pattern is that of orthorhombic $H_2Ti_2O_5 \cdot H_2O$. Thermal treatment at 400° C. of orthorhombic $H_2Ti_2O_5 \cdot H_2O$ phase material can induce a phase transformation from the orthorhombic $H_2Ti_2O_5 \cdot H_2O$ phase to anatase $TiO_2$.

Numerous modifications and variations of the present invention are possible in light of the above teachings. It is therefore to be understood that within the scope of the appended claims, the invention may be practiced otherwise than as specifically described herein.

The invention claimed is:

1. A separation column, comprising:
a stationary phase comprising at least 90 wt. % of titanium oxide nanotubes, relative to a total weight of the stationary phase,
wherein the titanium oxide has a formula $H_xNa_{2-x}Ti_2O_5 \cdot (H_2O)$, wherein $x \leq 2$, and
wherein the nanotubes have an average diameter in a range of from 5 to 200 nm, a BET surface area in a range of from 175 to 225 m$^2$/g, and/or an average pore size in a range of from 65 to 85 Å, and/or an average particle size in a range of from 60 to 125 μm.

2. The column of claim 1, wherein the average diameter of the nanotubes is no greater than 20 nm.

3. The column of claim 1, wherein the titanium oxide nanotubes have an anatase crystal structure.

4. The column of claim 1, having a length in a range of from 10 to 30 cm and a diameter in a range of from 4 to 10 cm.

5. The column of claim 1, wherein the stationary phase comprises no more than 0.1 wt. % of organic polymer and graphite.

6. The column of claim 1, which does not contain graphene.

7. A separation column, comprising:
a stationary phase comprising at least 90 wt. % of titanium oxide nanotubes relative to a total weight of the stationary phase,
wherein the titanium oxide has a formula $H_xNa_{2-x}Ti_2O_5 \cdot (H_2O)$, wherein $x \leq 2$,
wherein the nanotubes have an average diameter in a range of from 5 to 200 nm, and
wherein the titanium oxide nanotubes have an average pore size of from 65 to 85 Å.

8. The column according to claim 1, comprising no more than 0.5 wt %, relative to the total stationary phase weight, of a total amount of a polyolefin polymer, a polyamide polymer, a polyimide polymer, a polyester, a polysulfone, an ABS polymer, a PAN polymer, a PES polymer, a PEVK polymer, a PVC polymer, a polyurethane polymer, a polyacrylonitrile polymer, a polychloroprene polymer and a fluoropolymer.

* * * * *